(12) United States Patent
Enyedy et al.

(10) Patent No.: US 10,416,701 B2
(45) Date of Patent: Sep. 17, 2019

(54) SYSTEMS AND METHODS OF CONTROLLING A MAXIMUM POWER OUTPUT LEVEL OF AN ENGINE-DRIVEN POWER SOURCE SYSTEM

(71) Applicant: Lincoln Global, Inc., Santa Fe Springs, CA (US)

(72) Inventors: Edward A. Enyedy, Eastlake, OH (US); Bruce John Chantry, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 15/638,492

(22) Filed: Jun. 30, 2017

(65) Prior Publication Data
US 2017/0308111 A1    Oct. 26, 2017

Related U.S. Application Data

(63) Continuation-in-part of application No. 14/844,289, filed on Sep. 3, 2015, now Pat. No. 10,162,375.

(51) Int. Cl.
*G05D 11/00* (2006.01)
*G05F 1/67* (2006.01)
(Continued)

(52) U.S. Cl.
CPC ............... *G05F 1/67* (2013.01); *F02D 41/26* (2013.01); *G01S 19/39* (2013.01); *G05B 15/02* (2013.01); *G05F 1/66* (2013.01)

(58) Field of Classification Search
CPC ... G05F 1/67; G05F 1/66; G05B 15/02; G01S 19/39; F02D 41/26
(Continued)

(56) References Cited

U.S. PATENT DOCUMENTS

| 4,216,367 A | 8/1980 | Risberg |
|---|---|---|
| 4,419,562 A | 12/1983 | Jon et al. |

(Continued)

FOREIGN PATENT DOCUMENTS

| CA | 2 265 215 A1 | 2/1999 |
|---|---|---|
| CN | 20289549 U | 4/2013 |

(Continued)

OTHER PUBLICATIONS

"Welder/Generator: Welding equipment—Technology for pipeline construction"; Vietz GmbH; www.vietz.de/wp-content/uploads/2016/welder_generator.pdf); Dated May 2016; pp. 1-12.
(Continued)

*Primary Examiner* — Tha-O H Bui
(74) *Attorney, Agent, or Firm* — Brad C. Spencer

(57) ABSTRACT

An electric arc generation device includes an internal combustion engine operatively coupled to a generator, an arc generation power supply powered by the generator, an ECU configured to control a maximum power output level of the engine according to one of a low power routine and a high power routine, and a position signal receiver operatively connected to the ECU. The position signal receiver is configured to receive a position signal, generate current position information based on the position signal, and provide the current position information to the ECU. The ECU is configured to compare the current position information to predetermined region data, and automatically switch from one of the high power routine and the low power routine to a different one of the high power routine and the low power routine based on a result of the comparing, to automatically control the maximum power output level of the engine.

18 Claims, 10 Drawing Sheets

(51) Int. Cl.
*G05B 15/02* (2006.01)
*G01S 19/39* (2010.01)
*F02D 41/26* (2006.01)
*G05F 1/66* (2006.01)

(58) Field of Classification Search
USPC .......................................................... 700/297
See application file for complete search history.

(56) References Cited

U.S. PATENT DOCUMENTS

| | | | |
|---|---|---|---|
| 5,667,704 | A | 9/1997 | Kolodziej |
| 5,670,070 | A | 9/1997 | Clark |
| 6,040,555 | A | 3/2000 | Tiller |
| 6,636,776 | B1 | 10/2003 | Barton |
| 6,815,640 | B1 | 11/2004 | Spear et al. |
| 7,205,503 | B2 | 4/2007 | Reynolds |
| 7,532,955 | B2 | 5/2009 | Dougherty |
| 7,643,890 | B1 | 1/2010 | Hillen |
| 7,715,951 | B2 | 5/2010 | Forbes, Jr. et al. |
| 7,751,926 | B2 | 7/2010 | DiVenere et al. |
| 7,848,765 | B2 | 12/2010 | Phillips et al. |
| 8,558,139 | B2 | 10/2013 | Albrecht |
| 8,785,817 | B2 | 7/2014 | Luck |
| 8,847,115 | B2 | 9/2014 | Casner |
| 8,957,344 | B2 | 2/2015 | Rappl et al. |
| 2003/0212684 | A1 | 11/2003 | Meyer et al. |
| 2006/0076335 | A1 | 4/2006 | Reynolds |
| 2007/0080150 | A1 | 4/2007 | Albrecht et al. |
| 2009/0234483 | A1 | 9/2009 | Leko et al. |
| 2011/0309053 | A1 | 12/2011 | Baus |
| 2012/0241428 | A1* | 9/2012 | Kowaleski ............ B23K 9/1006 219/130.1 |
| 2013/0075380 | A1 | 3/2013 | Albrecht et al. |
| 2013/0327747 | A1 | 12/2013 | Dantinne et al. |
| 2014/0166634 | A1 | 6/2014 | Reynolds |
| 2014/0240125 | A1 | 8/2014 | Burch et al. |
| 2014/0332515 | A1 | 11/2014 | Luck |
| 2015/0069038 | A1 | 3/2015 | Burkhart |
| 2015/0273611 | A1 | 10/2015 | Denis |
| 2016/0039033 | A1 | 2/2016 | Fosbinder |
| 2016/0167153 | A1 | 6/2016 | Denis |
| 2016/0260261 | A1 | 9/2016 | Hsu |
| 2016/0303677 | A1 | 10/2016 | Furman |
| 2016/0318113 | A1 | 11/2016 | Enyedy |
| 2017/0036290 | A1 | 2/2017 | Enyedy |

FOREIGN PATENT DOCUMENTS

| | | |
|---|---|---|
| CN | 103817405 A | 5/2014 |
| CN | 203732959 U | 7/2014 |
| CN | 203773296 U | 8/2014 |
| JP | H07108385 A | 4/1995 |
| JP | H09192850 A | 7/1997 |
| KR | 20100069914 A | 6/2010 |
| WO | 2014/150118 A1 | 9/2014 |

OTHER PUBLICATIONS

"Weld Package PlasmaTIG"; http://www.sks-welding.com/fileadmin/download/pdf/en/plasmating_plasma_en.pdf; Downloaded on Apr. 21, 2016.

"MP Series DSP Digital Multi-Process Welding Machine"; http://www.hanshen-welding.com/MP-Series-DSP-Digital-Multi-Process-Welding-Machine.htm#.VZoKmPmqqko; Downloaded on Apr. 21, 2016.

Extended European Search Report from Corresponding Application No. EP18181244.7; dated Nov. 22, 2018; pp. 1-7.

* cited by examiner

SYSTEMS AND METHODS OF CONTROLLING A MAXIMUM POWER OUTPUT LEVEL OF AN ENGINE-DRIVEN POWER SOURCE SYSTEM

CROSS-REFERENCE TO RELATED APPLICATIONS

This application is a continuation-in-part of U.S. patent application Ser. No. 14/844,289 filed on Sep. 3, 2015, the disclosure of which is incorporated herein by reference.

TECHNICAL FIELD

The present embodiments relate generally to a power source system. More particularly, the present embodiments relate to a power source system that includes a power source connected via network to a central controller that is remote from the power source and communicates a signal adapted to alter an operating parameter of the power source.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

In accordance with one embodiment a power source system includes plural power sources, wherein each of the plural power sources is adapted to provide a configurable power output to an implement, and wherein each of the plural power sources has an onboard controller; a central controller that is remote from the plural power sources; the central controller being in communication with respective onboard controllers via one or more networks, the central controller being adapted to communicate a signal to at least one onboard controller to selectively alter an operating condition of an associated power source. In one example, the signal instructs the onboard controller to deactivate power to the implement or deactivate the associated power source to prevent operation thereof. In another example, the signal configures the onboard controller to set a maximum available power output of the associated power source to a configured output level. The configured output level may be a selected amperage, voltage, wattage or other unit of measurement commonly referred to in a given application or industry. For example, in a welding application it is common to refer to power in terms of an amperage. For example, the configurable power may be expressed as 100 amp, 300 amp, 500 amp and so on. These values are provided as examples. It will be understood that any value between 0 and the maximum available power for a given power source may be used.

According to another exemplary embodiment, the onboard controller is adapted to monitor an emission level of the associated power source and communicate emission information to the central controller; and wherein the central controller receives the emission information from the onboard controller and a maximum available power output of the associated power source based on the emission information received.

According to another exemplary embodiment the implement is a welding torch. In another exemplary embodiment, the implement is a cutting torch.

According to another exemplary embodiment at least one of the plural power sources includes an accessory, and wherein the operating condition includes an activation state of the accessory.

According to another exemplary embodiment, the onboard controller includes a sensor that tracks a limiting condition and communicates a value of the limiting condition to the central controller, and wherein upon detection of the value of the limiting condition reaching a selected limit, the central controller alters the operating condition. According to a further example, the limiting condition includes at least one of an operating time limit, a geographical limit, an emissions limit, a pollution limit, a noise limit, a network connectivity limit, and a time limit.

Another exemplary embodiment includes power source system including power source in communication with a power source network, wherein each of power source in the network has an active mode where power is provided to an implement and an idle mode where no power is being provided to the implement; a central controller in communication with the power source network, the central controller being remote from the power source and in communication with the power source via the power source network, wherein the central controller monitors a time period of operation for the power source, wherein the time period of operation includes active mode time but excludes idle mode time, and wherein the central controller deactivates the power source when a respective time period of operation exceeds an authorized period of operation.

According to another exemplary embodiment, the implement is a welding torch.

According to another exemplary embodiment, the central controller calculates a charge based on the time period of operation. According to a further embodiment, the power source includes a payment component, wherein the central controller communicates with the payment component and wherein the central controller includes a maximum period of operation for each of the plural power sources and deactivates a selected power source when the time period of operation is reached. According to a further example, the central controller is adapted to allocate an additional maximum period of operation or an extension of the maximum period of operation upon receiving a selected payment from the means for payment.

Another exemplary embodiment includes power source system including a processor; a communications interface; and a computer-readable storage medium having stored thereon computer-executable instructions that, when executed by the processor, configure the processor to: receive, via the communications interface, operational information from an onboard controller of a power source adapted to provide a configurable power output to an implement; and communicate a signal to the onboard controller to alter an operating state of the power source based at least in part on the operational information. According to on example, the signal instructs the onboard controller to deactivate power to the implement or deactivate the associated power source to prevent operation thereof. According to another example, the signal configures the onboard controller to set a maximum available power output of the associated power source to a configured output level.

Another exemplary embodiment includes power source system including plural power sources, wherein each of the plural power sources is adapted to provide a configurable power output to an implement, and wherein each of the plural power sources has an onboard controller; a central controller that is remote from the plural power sources and in communication with each power source, wherein the central controller tracks a location of each of the plural power sources and wherein the central controller receives geographic based alert information; wherein the central controller sets a parameter including at least one of the configurable power output, an engine operating limit, and an accessory operating limit of each power source based on the geographic based alert information. According to one example, the geographic based alert information includes ozone action alerts. According to another example, the geographic based alert information includes a noise restriction. According to a further example, the geographic based alert includes a permitted geography limit.

Another exemplary embodiment includes a method of controlling an engine-driven electric arc generation device. The method includes the step of providing the engine-driven electric arc generation device. The engine-driven electric arc generation device comprises an internal combustion engine operatively coupled to an electric generator, an arc generation power supply powered by the electric generator, an engine control unit (ECU) configured to control a maximum power output level of the internal combustion engine according to one of a low power routine and a high power routine, and a global navigation satellite system (GNSS) receiver operatively connected to the ECU. The method further includes the steps of receiving, by the GNSS receiver, GNSS signals; determining current position information of the engine-driven electric arc generation device from the GNSS signals; comparing the current position information to predetermined low power routine region data; and automatically switching, by the ECU, from the high power routine to the low power routine based on a result of comparing the current position information to the predetermined low power routine region data, to automatically limit the maximum power output level of the internal combustion engine when running.

According to another exemplary embodiment, the step of comparing the current position information to the predetermined low power routine region data is performed by the ECU. According to another exemplary embodiment, the step of comparing the current position information to the predetermined low power routine region data is performed by a central controller that is remote from the engine-driven electric arc generation device. According to another exemplary embodiment, the method of controlling an engine-driven electric arc generation device further includes the step of automatically switching, by the ECU, from the low power routine to the high power routine based on another result of comparing current position information to the predetermined low power routine region data. According to another exemplary embodiment, the engine-driven electric arc generation device includes a welding torch operatively connected to the arc generation power supply. According to another exemplary embodiment, the engine-driven electric arc generation devices includes a cutting torch operatively connected to the arc generation power supply. According to another exemplary embodiment the GNSS receiver is a GPS receiver configured to receive GPS signals.

Another exemplary embodiment includes an engine-driven electric arc generation device. The device comprises an internal combustion engine, an electric generator driven by the internal combustion engine, an arc generation power supply powered by the electric generator, an engine control unit (ECU) configured to control a maximum power output level of the internal combustion engine according to one of a low power routine and a high power routine, and a position signal receiver operatively connected to the ECU. The position signal receiver is configured to receive a position signal, generate current position information based on the position signal, and provide the current position information to the ECU. The ECU is configured to compare the current position information to predetermined region data, and automatically switch from one of the high power routine and the low power routine to a different one of the high power routine and the low power routine based on a result of comparing the current position information to the predetermined region data, to automatically control the maximum power output level of the internal combustion engine when running.

According to another exemplary embodiment, the position signal receiver is a global navigation satellite system (GNSS) receiver. According to another exemplary embodiment, the predetermined region data defines a low power routine region in which the low power routine is used by the ECU to automatically limit the maximum power output level of the internal combustion engine when running. According to another exemplary embodiment, the ECU is configured to automatically switch from the low power routine to the high power routine when the engine-driven electric arc generation device exits the low power routine region. According to another exemplary embodiment, the device further comprises a welding torch operatively connected to the arc generation power supply. According to another exemplary embodiment, the device further comprises a cutting torch operatively connected to the arc generation power supply.

Another exemplary embodiment includes a method of controlling an engine-driven device. The method comprises the step of providing the engine-driven device. The engine-driven device comprises an internal combustion engine, an engine control unit (ECU) configured to control a maximum power output level of the internal combustion engine according to one of a low power routine and a high power routine, and a global navigation satellite system (GNSS) receiver operatively connected to the ECU. The method further comprises the steps of receiving, by the GNSS receiver, GNSS signals; determining current position information of the engine-driven device from the GNSS signals; comparing the current position information to predetermined low power routine region data; and automatically switching, by the ECU, from the high power routine to the low power routine based on a result of comparing the current position information to the predetermined low power routine region data, to automatically limit the maximum power output level of the internal combustion engine when running.

According to another exemplary embodiment, the step of comparing the current position information to the predetermined low power routine region data is performed by the ECU. According to another exemplary embodiment, the step of comparing the current position information to the predetermined low power routine region data is performed by a central controller that is remote from the engine-driven device. According to another exemplary embodiment, of controlling an engine-driven device further comprises the step of automatically switching, by the ECU, from the low power routine to the high power routine based on another result of comparing current position information to the predetermined low power routine region data. According to another exemplary embodiment, the GNSS receiver is a GPS receiver configured to receive GPS signals.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
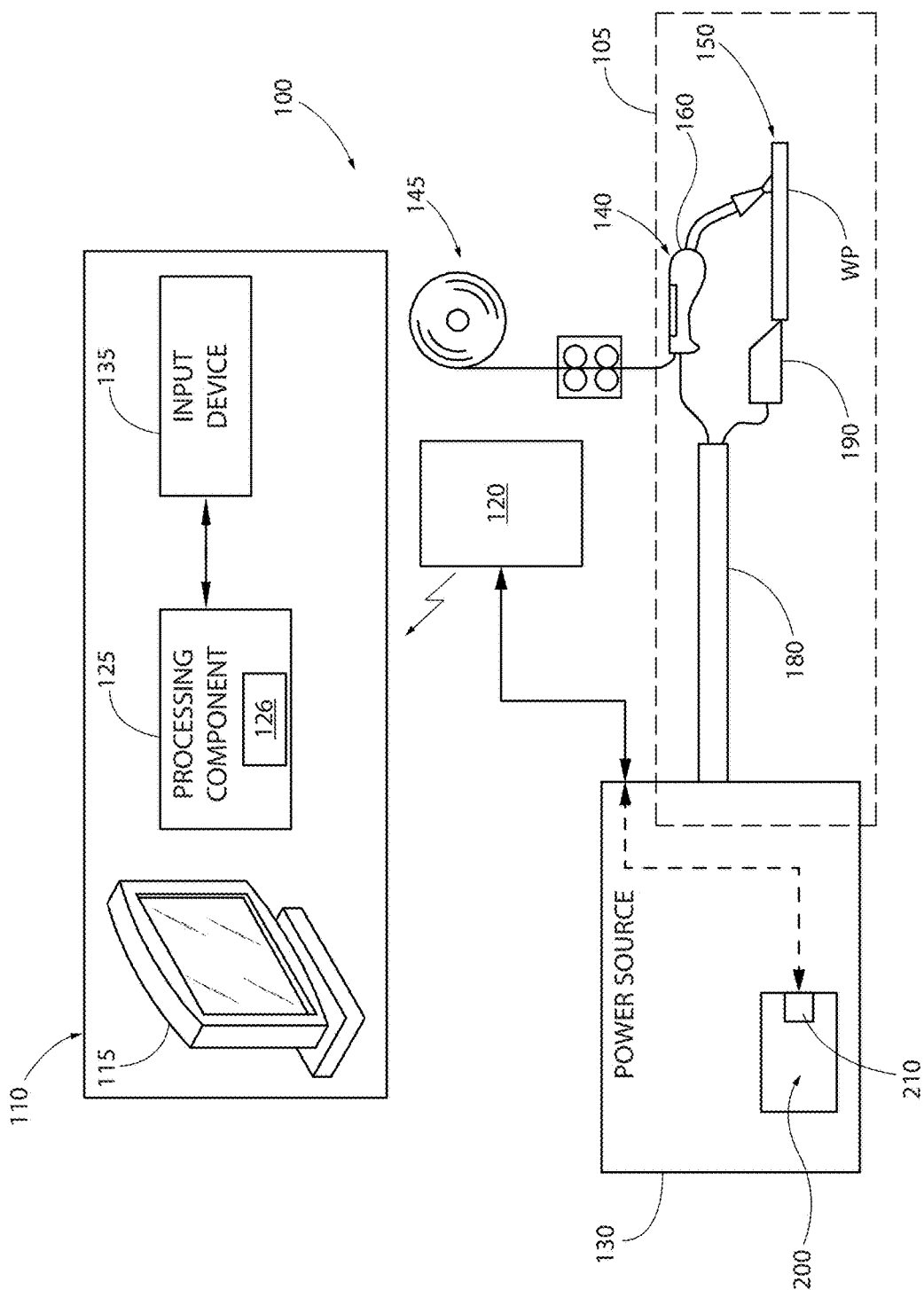
FIG. 1 is a schematic block diagram illustrating a power source system according to an embodiment.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "remote" is defined as physically separated from an object by a distance. For example, a controller is described as being remote from a power source to indicate that they are not physically connected to each other.

As used in this application, the term "component" is intended to refer to a electronic and/or computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

In general, the following specification discusses the remote control of plural power sources connected to a controller through a network. It will be understood that the power source may be used in a variety of applications that require electrical power including but not limited to vehicles, power tools, portable generators, cement mixers, welding, heating, soldering, brazing, and cutting applications. To that end, reference to a power source should not be considered limiting as to a particular application or implement powered by the power source. The following description will proceed with reference to a power source used in welding and cutting, but this should not be viewed as limiting. The use of the terms welding and cutting is for sake of simplicity and should be understood to include welding, cutting, heating, soldering, and brazing.

One possible application for this remote control of plural power sources is in connection with rental applications or other fleet operations of power sources. For example, rental companies rent welding and cutting equipment including power sources. These power sources may include power sources that must be connected to a power supply, portable power sources that contain their own power supply, such as an engine driven generator or energy storage device, or hybrid systems that combine types of power supplies. In renting such equipment, different welding or cutting processes may require different amounts of power so that the rental company may stock several models to accommodate various power needs. For example, rental companies often stock power supplies that provide different maximum amperage, such as 100 amp, 300 amp, or 500 amp supplies. The power supplies may also be stocked to include different types of welding or cutting operations. For example, in the welding context, different welding power supplies may be required to provide multiple welding modes, such as pulse, surface tension transfer (STT) and the like. Again to accommodate varying needs among users, multiple power supplies may need to be stocked. The same holds true in a non-rental context where plural welding power supplies are stocked for use by employees or contractors to accommodate varying needs for power supplies.

In addition, users may want power sources with built in accessories, such as, pumps or air compressors. It is difficult to predict the demand for various power levels or accessories and at times, power sources with greater capacity than required or accessories that the user does not need may be rented at a lower rate. Also, it is common that an accessory may be used infrequently by the user or the maximum power level only used for a shorter period of operation. To provide more flexibility to the user, the invention contemplates providing central control to allow the user to select and/or pay for only the features and power level that they need, and allow them to alter the power level or available features remotely from the rental site or other source. The flexibility may also be used by the user to provide a one size fits all option in terms of purchasing power sources according to the invention and using the remote control feature to impose limits on operation, available features, and accessories to customize the setup of the power source based on the users' needs or to conform the power source to the terms of the rental contract or limits on operation imposed by outside factors. Outside factors may include environmental factors such as ozone alerts, emission level restrictions in a particular geographic location, noise restrictions, and the like. Finally, the system described herein may be used to deactivate or prevent operation of the power source from a remote location. This remote deactivation may be dictated by the terms of the rental agreement including but not limited to agreed to time limits, or when operation outside of an agreed to geographic area occurs or when a user repeatedly attempts to use the power source outside of the terms of the agreement or tampers with the power source. Deactivation may be temporary allowing the user to reactivate the equipment by satisfying a condition, such as paying for more time or returning the welder to a permitted geographical location. While the description will proceed with the example of a power source for welding or cutting operations, it will be understood that the control scheme utilized may be expanded to include other commonly rented goods including vehicles, air compressors, cement mixers, and power tools powered by a power source.

Figure 2:
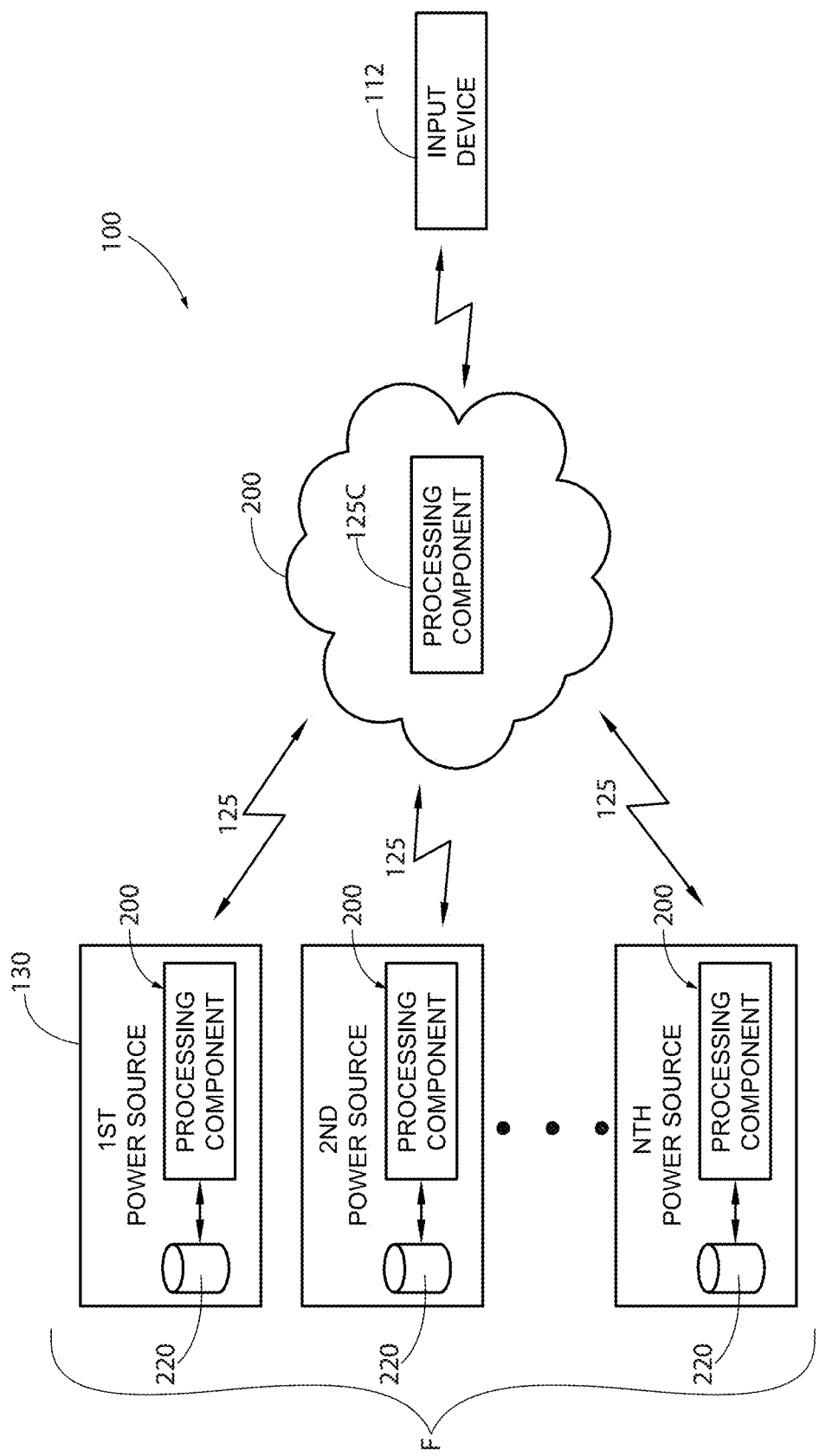
FIG. 2 is a schematic block diagram illustrating a power source system according to an embodiment.
Figure 3:
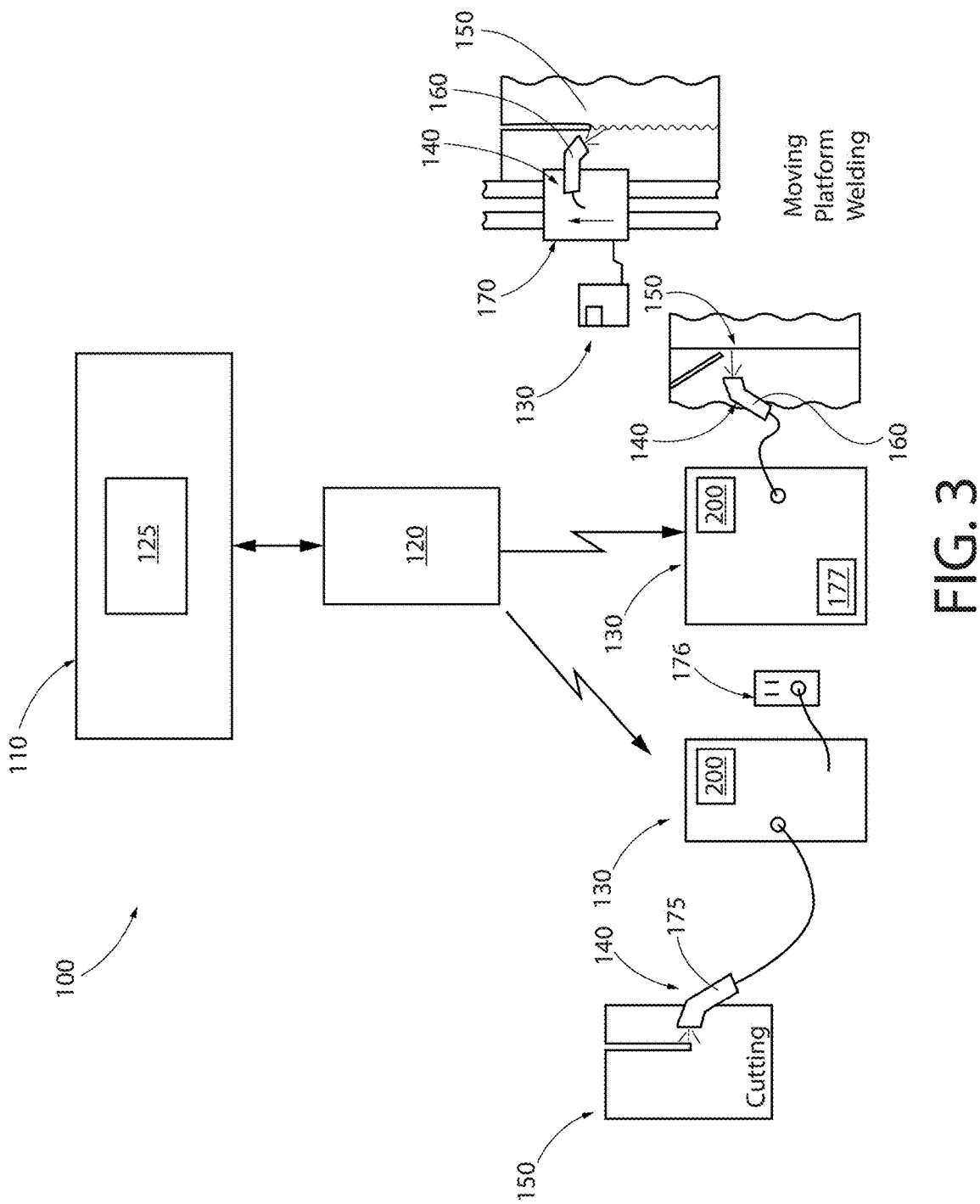
FIG. 3 is a schematic block diagram illustrating a power source system according to an embodiment.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates a schematic block diagram of an exemplary embodiment of a power source system, generally indicated by the number 100. System 100 includes a central controller 110 that is connected to a network 120. The system 100 also includes one or more power source 130 that is connected to central controller 110 by network 120. As shown in FIG. 2, it is contemplated that system may include a central controller 130 that is connected to plural power sources 130 (a first power source, second power source . . . nth power source). With further reference to FIG. 3, the power sources 130 may be used to perform a variety of applications, as discussed in more detail herein. FIG. 3 shows, for example, a first power source may be used in a cutting application, a second may be used to perform stick welding and still another power source may be used in a moving platform welding application. Each power source 130 is connected to central controller 110 via network 120 as described more completely below.

With reference to FIG. 1, system 100 further includes an implement 140 that is connected to one of the power sources 130 to perform an operation 150. Implement 140 may be any vehicle, tool, accessory or other object that obtains power from power source 130. In a welding application, implement 140 may include a welding torch 160 that uses electrical power from the power source to perform a welding operation including but not limited to heating, soldering, brazing, arc welding or laser welding. Implement 140 may include related equipment such as a consumable feeder, generally indicated at 145, such as a wire feeder for MIG or TIG welding or a stick feeder for stick welding. In welding applications where the welding torch 160 is mounted on a moving platform 170 (FIG. 3), often referred to as a tractor or robot, that is also powered by the same power source 130, implement 140 may include this equipment 170 as well. Plasma or laser cutting applications are similar in that implement 140 may include a cutting torch 175 that uses electrical energy from power source 130 to perform a cutting operation rather than a welding operation.

Figure 6:
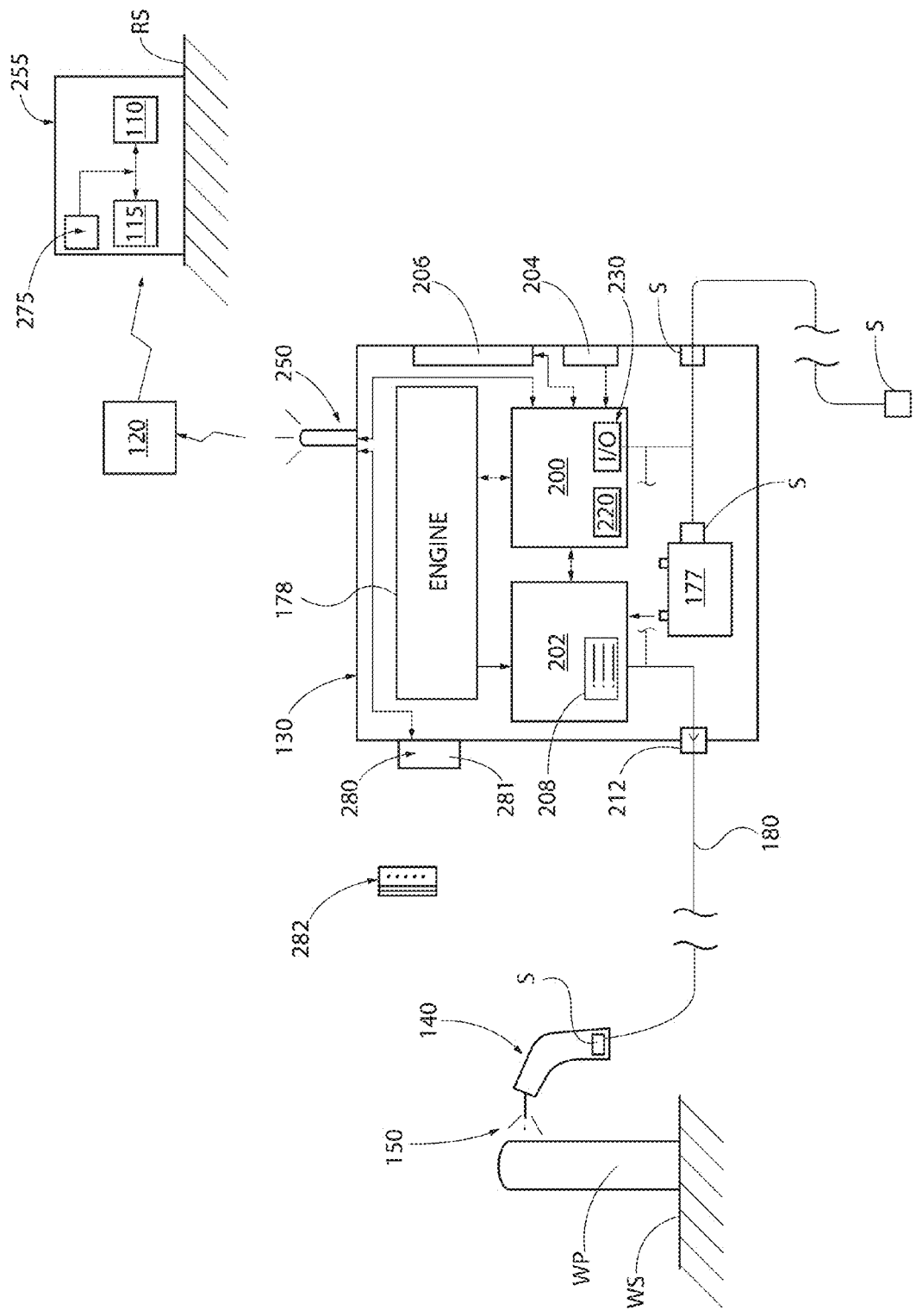
FIG. 6 is a schematic block diagram of a power source system according to an embodiment depicting details of a payment component.

Power source 130 can be any suitable power source including a power source that derives power from an outlet source 176 (FIG. 3), a battery source or other energy storage device 177 (FIG. 6), an engine power source 178 (FIG. 6), or combinations thereof including hybrid combinations that include an engine driven power source combined with a battery source to back up or supplement the power from the engine driven source (FIG. 6). In a rental context, a variety of power sources 130 may form part of the rental fleet F such that multiple types of power sources may comprise the plural power sources available for rental. For example, an engine driven, battery driven or combination of engine and battery driven power source may be used in applications where grid power or outlet power is not available. Alternatively, the same rental fleet may include outlet power sources to be used in locations where grid power is available or generator power is used to provide an outlet supply for the power source.

With reference to FIG. 1, in an arc welding application, a welding circuit path 105 runs from power source 130 through a welding cable 180 to welding torch 160, through workpiece WP and/or to workpiece connector 190, and back through welding cable 180 to power source 130. During operation, electrical current runs through welding circuit path 105 as a voltage is applied to welding circuit path 105. In accordance with an exemplary embodiment, welding cable 180 comprises a coaxial cable assembly. In accordance with another embodiment, welding cable 180 comprises a first cable length running from welder power source 130 to welding torch 160, and a second cable length running from workpiece connector 190 to welder power source 130.

Figure 4:
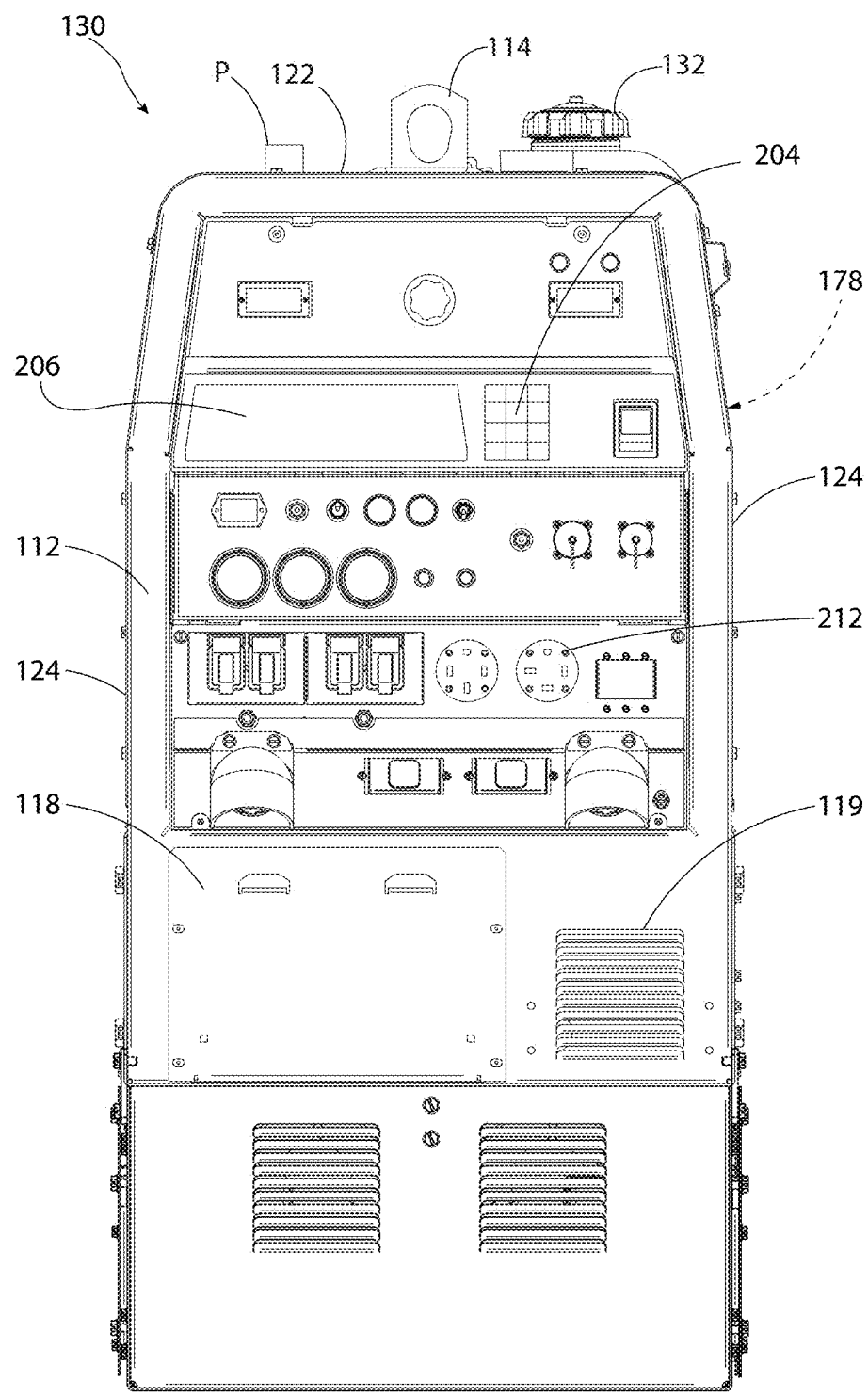
FIG. 4 is a power source according to an embodiment.

FIG. 4 depicts an embodiment of a system 100 used in a welding or cutting application. The system 100 includes a power source 130 having a housing 112 which encloses the internal components of the power source 130. Optionally, power source 130 includes a loading eyehook 114 and/or fork recesses. The loading eyehook 114 and the fork recesses facilitate the portability of the power source 130. Optionally, a handle and/or wheels may be provided to further facilitate mobility. The housing 112 also includes one or more access panel 118. Access panel 118 provides access to the internal components of the welding type device 100 including, for example, an energy storage device suitable for providing welding type power, such as a DC power source including but not limited to a batter, capacitor or kinetic energy storage device. An end panel includes a louvered opening 119 to allow for air flow through the housing 112.

The housing 112 of power source shown in FIG. 4 also houses an internal combustion engine. The engine is operatively coupled with exhaust port P and fuel port 132 that protrude through the housing 112. The exhaust port P extends above the top panel 122 of the housing 112 and directs exhaust emissions away from power source 130. The fuel port 132 preferably does not extend beyond the top panel 122 or side panel 124. Such a construction protects the fuel port 132 from damage during transportation and operation of the power source 130.

Figure 5:
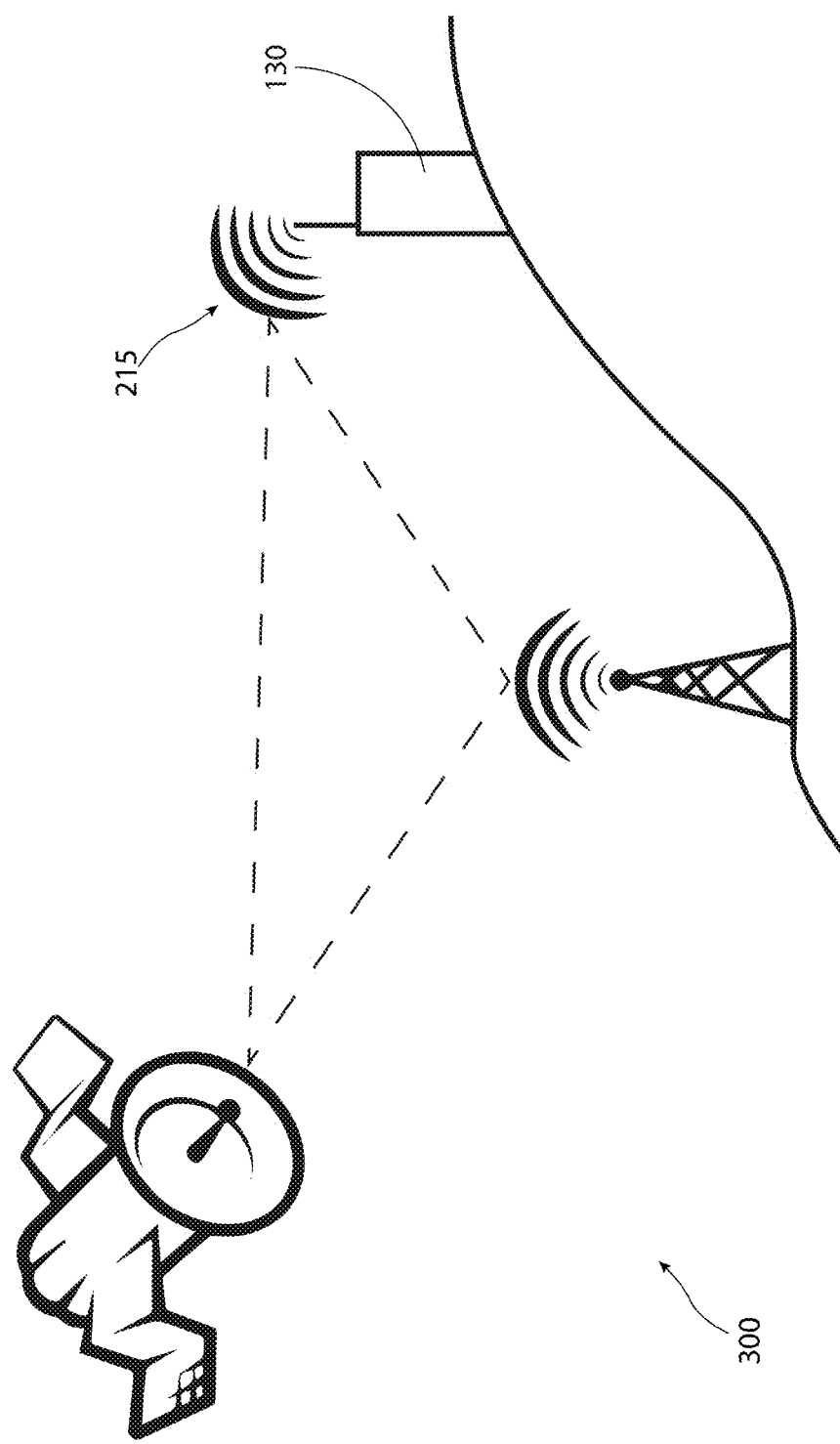
FIG. 5 is a schematic diagram of a power source system according to an embodiment depicting details of a geographic location component on a power source.

System 100 includes a processor 125 that evaluates a portion of data collected by at least one power source 130. Processor 125 ascertains a parameter related to power source 130. Processor 125 enables a parameter from one welder power source in an environment on a first network to be utilized with at least one of another welder power source in the environment on the first network, another welder power source in the environment on a second network, or another welder power source in another environment. Moreover, processor 125 can implement a parameter collected with a suitable component or device utilized in a welding process (e.g., wire feeder, power source, among others). Processor 125 may also obtain parameters from an onboard controller 200 associated with power source 130. As schematically shown in FIG. 5, onboard controller 200 may include a communications interface 250 that communicates with a global communications network 300 to provide a geographic position signal 215 selectively communicated from onboard controller 200 to processor 125.

Processor 125 can be local or remote in comparison to power source 130. For instance, processor 125 can be a stand-alone component, incorporated into power source 130, or it may be provided remote from power source 130. Processor 125, may be incorporated into a computing platform (e.g., remote platform, local platform, cloud platform, software-as-a-service (SaaS) platform, among others).

In one embodiment, processor(s) 125 is a computer operable to execute the disclosed methodologies and processes, including methods described herein. To provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with processor 125.

The processor 125 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within processor 125, such as during start-up, is stored in the ROM.

Processor 125 can further include a hard disk drive, a magnetic disk drive, e.g., to read from or write to a removable disk, and an optical disk drive, e.g., for reading a CD-ROM disk or to read from or write to other optical media. Processor 125 can include at least some form of computer readable medium, generally indicated at 126. Computer readable media 126 can be any available media that can be accessed by the computer. By way of example, and not limitation, computer readable media 126 may comprise computer storage media and communication media. Computer storage medium 126 includes volatile and non-volatile, removable and non-removable media implemented in any method or technology for storage of information such as computer readable instructions, data structures, program modules or other data. Computer storage medium 126 includes, but is not limited to, RAM, ROM, EEPROM, flash memory or other memory technology, CD-ROM, digital versatile disks (DVD) or other magnetic storage devices, or any other medium which can be used to store the desired information and which can be accessed by processor 125.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in processor 125 can be any of a number of commercially available operating systems.

In addition, a user may enter commands and information into the computer through a user input device, generally indicated at 135 including but not limited to a keyboard, keypad, touchscreen, jog shuttle, and a pointing device, such as a mouse. Other input devices 135 may include a microphone, an IR remote control, a track ball, a pen input device, a joystick, a game pad, a digitizing tablet, a scanner, or the like. These and other input devices 135 are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 115), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or in combination with display 115) can be employed with processor 125 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from processor 125 via any wireless or hard wire protocol and/or standard. In another example, processor 125 and/or system 100 can be utilized with a mobile device such as a cellular phone, a smart phone, a tablet, a portable gaming device, a portable Internet browsing device, a Wi-Fi device, a personal digital assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

According to an embodiment, each power source 130 within system 100 includes an onboard controller 200. Onboard controller may be an integral component of power source 130 or be retro fit to existing power sources within a fleet F to provide the control methods described herein. As best shown in FIG. 6, onboard controller 200 is connected to various components within the power source including the power circuit 202 used in generating the power output and providing power output to the implement 140. In an engine driven power source 130, onboard controller 200 is connected to the engine 178 or various components thereof to control operation of the engine including engine revolutions per minute (RPM), combustion, idle, or other aspects of the engine to control power output, emissions, noise levels or other characteristics of the engine driven power supply that require control. The same is true of a hybrid power source that includes an engine component 178 and energy storage device 177. In the example shown in FIG. 6, connection to the energy storage device 177 and engine component 178 is made through power circuit 202. As further shown in FIG. 6, onboard controller 200 may be connected to additional components including an onboard input device 204 that receives input from the user and an onboard output or onboard display 206 that provides information to user.

When retrofitting onboard controller 200 to an existing power source, onboard controller 200 may additionally be connected to other components or circuitry that perform control functions, such that onboard controller has the ability to select, limit, disable, or override the control functions provided. For example, in a welding context, an existing power supply may include a waveform generator 208 with a library or look up table of waveforms or welding modes that can be generated by power source. As shown, wave form generator 208 may be provided as part of power circuit 202. Onboard controller 200 may be connected to the wave form generator 208 to limit the number of waveforms available, provide selected waveforms, or add additional wave form capability. It will be understood that other connections to existing components and circuitry may be needed when retrofitting onboard controller 200 to an existing power source 130.

Onboard controller 200 may include an onboard data store 220 that can store information, component change(s), and history associated with power source 130 or data communicated from central controller 110. For example, the onboard data store 220 can store a date of configuration of onboard controller 200, a time of configuration, a hardware configuration of power source 130, a software version of onboard controller 200, a serial number and/or an identification of onboard controller 200, a welding program installed in the welding onboard controller 200 and/or a memory capacity of onboard controller 200. The information stored in the power supply configuration data store 220 can facilitate troubleshooting, servicing, operating, maintenance and/or upgrading of the welding power source 130.

Processor 125 can facilitate reconfiguration of onboard controller 200 based, at least in part, upon information stored in the onboard data store 220. For example, the processor 125 can facilitate sending information (e.g., voltage setting(s), waveform(s) and/or current setting(s)) to onboard controller 200 to configure power source 130. Central controller 110 can also configure other parameters of power source including operational parameters, such as operating characteristics or features available to the user, limits on operation based on emissions requirements, noise requirements, geographical limits or other limits imposed by an agreement between the user and the owner, such as a rental/lease agreement or other conditions placed upon operation by an external source. Examples of features include but are not limited to modes of operation. In a welding context, these modes of operation may include selection of various waveforms or welding processes, such as pulse or surface tension transfer (STT), gas metal arc welding (GMAW), flux cored arc welding, metal cored arc welding, submerged arc welding (SAW), narrow groove welding, gas tungsten arc (GTAW) welding, plasma arc welding, electron beam and laser welding, hard surfacing welding, arc gouging and/or manual shielded arc welding (SMAW).

The operational parameter may also include the available or configurable power output of the power source. For example, a power source 130 may be capable of producing a power measured in amps, such as 500 amps. Central controller 110 may, however, configure output of power source 130 to a power value less than the maximum power that power source 130 is capable of producing. In the 500 amp example, central controller 110 may configure power source 130 to produce a maximum amperage of 100 amp, 300 amp etc. In some instances, to deactivate power source, central controller 110 may configure power source to produce 0 amp.

Onboard controller 200 may include an input output component 230. Input output component 230 can receive input signal(s) from various sensors S or other detecting or information providing components associated with power source 130. For example, input output component 230 can receive an input signal from a proximity switch indicating that a work piece WP is physically present or operating environment conditions such as temperature, humidity, atmospheric pressure and the like from an appropriate sensor. Based at least in part upon information from the input output component 230, onboard controller 200 can provide a power output to an output port 212. Additionally, the input output component 230 can send output signal(s) to central controller 110 via communications component 250.

Figure 7:
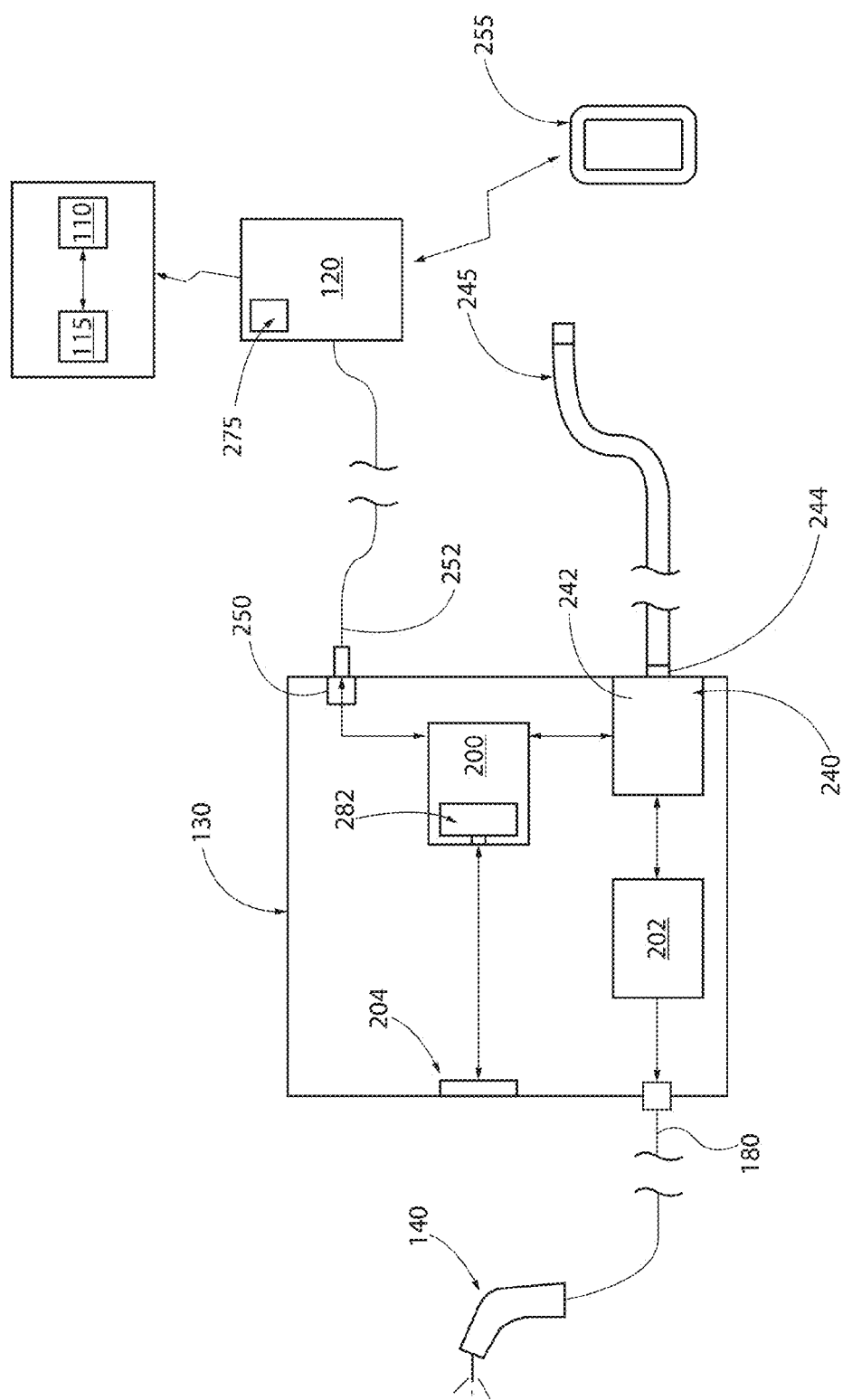
FIG. 7 is a schematic block diagram according to an embodiment showing details of a remote device that communicates with a central controller in the power source system.

With reference to FIG. 7, an accessory component 240 can control operation of additional components associated with implement 140, such as consumable delivery devices including but not limited to wire feeders, gas or other fluid sources, and the like or accessories 242 that are provided with power source 130 that are separate from implement, such as for example, an air compressor or pump provided with power source 130. An accessory connector 244 may be provided on power source 130 to attach an accessory 242 to power source, or in the case of an onboard accessory 242, accessory connector 244 may provide a connection to accessory such as for receipt of a conduit, cable, or hose, generally indicated at 245, used with accessory 242.

As discussed, onboard controller 200 includes a communications interface 250 to facilitate communication with a remote system(s) including but not limited to central controller 110. As shown in FIG. 6, communications interface 250 may be a wireless component that communicates through various wireless protocols described herein or, as shown in FIG. 7, a wired component that receives a network cable 252 or the like. Communication through either connection to the remote system may be made through a network 120 as discussed above.

Additional remote systems may include performance monitoring or other data tracking components that do not provide central control functionality. For example, operating conditions, parameters, location and other information associated or derived from data store 220 or onboard controller 200 may be communicated to a remote system(s) 255 for data storage, aggregation or monitoring. In the example shown, remote system 255 is a portable computing device, such as a personal computer, such as a laptop, tablet or wearable computer, a smart phone or personal digital assistant that allows remote monitoring of power source 130. For example, the communications interface 250 can retrieve information stored in data store 220 and transmit the information to the remote system(s) 255 to facilitate troubleshooting, servicing, operating, maintenance and/or upgrading of the welding power supply 200. By identifying, for example, a time of configuration of the power source 130, component change detail, and history of configuration of the power source 130 to remote system 255, the communications interface 250 can enable to a supervisor or technician located in a remote physical location from power source 130 to monitor or troubleshoot power source 130. As shown in FIG. 6, central controller 110 may be incorporated in remote system 255. As shown in FIG. 7, additional remote systems 255 may be used to communicate with central controller 110 and reconfigure the power source 130 as described above. In such instances, such additional remote systems 255 would need authorization to access the central controller's configuration functions. Alternatively, remote systems 255 may not have the authority to configure or alter power source 130 and instead have a read only type of function where access to information from power source 130 or central controller 110 could be obtained via the remote system 255 through network 120.

The communications interface 250 can be adapted for wired or wireless communication utilizing any known local or global network including cellular communications, Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the communications interface 250 can communicate via an extranet and/or a shared private network. The communications interface 250 can utilize post second generation mobile communications technology (e.g., 3G) to communicate with other device(s) (e.g., WAP gateway). The communications interface 250 can include software that is reprogrammable. The communications interface 250 can further communicate via one channel and/or shift among multiple channels, for example, depending on the type of communication being performed (e.g., voice, data and/or high-speed data). The communications interface 250 can further be adapted to utilize a particular communications modality based upon, for example, upon a priority level. Further, the communications interface 250 can be adapted to perform cognitive function(s) to facilitate communications. For example, the communications interface 250 can determine frequencies available for communication (e.g., temporary use), determine cost(s) associated with communication on each of the frequencies, negotiate usage rights with the owner(s) of the channels. Additionally, the communications interface 250 can further monitor the quality of transmission and/or receipt of information and adaptively modify the transmission frequency. It is to be appreciated that the communications interface 250 can include means for mobile communications that are embedded within power source 130, for example, a printed circuit equipped with a mobile communication chip set, and/or external to power source 130, for example, a mobile phone serving as a mobile communication modem for power source 130. In one implementation, the communications interface 250 can be adapted for infrared communications utilizing, for example, Infrared Data Association (IrDA) protocol(s). The communications interface 250 can implement one or more of the IrDA protocol layer(s): physical layer, link access protocol (Ir-LAP), link management protocol (IrLMP), information access service (IAS), tiny transport protocol (TinyTP), object exchange protocol (IrOBEX), serial and parallel port emulation (IrComm) and/or local area network access (Ir-Lan).

At least one of the central controller 110, onboard controller 200, and, if used, remote component 255 may optionally include a security component 275. The security component 275 facilitates secure communication between central controller 110, onboard controller and/or remote component 255. Given that welding information may be transferred over public networks such as the Internet, the security component 275 can provide encrypted data communications along with authentication and authorization services. Authentication refers to a determination that a purported user is whom they claim to be. Authorization is the process of verifying that a user has been authorized by central controller 110 to access welding information. Encryption is the conversion of data into a form, such as a ciphertest, that is not easily understood by unauthorized agents. For example, authentication, authorization, and non-repudiation may be established utilizing a Public Key Infrastructure (PKI) and X.509 Public Key Infrastructure Certificates to provide authentication and message integrity. Further, a Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

Negotiations can occur between the security component 275 of central controller 110 and onboard controller 200. These negotiations may be utilized to establish a secure (e.g., encrypted) data channel, for example, between the TCP/IP drivers of central controller 110 and power source 130. Security component 275 may be housed on any of the components within the system including at central controller 110 (FIG. 6) or hosted on network 120 (FIG. 7). Security component 275 also may be used to establish appropriate authorization to perform control functions through controller 110 i.e. configuring various parameters of power source 130. This component 275 may also be used for authentication and verification of payment through a payment component 280, described more completely below.

Optionally, a payment component, generally indicated at 280, may be incorporated with power source 130 to allow a user to pay for changes in power output, rental time, functionality, features, geographical scope or other aspects that may require payment without leaving a work site WS. As best shown, for example, in FIG. 6, power source 130 may be located at a work site WS that is remote from the location where the power source 130 was rented i.e. the rental site RS. In this instance, the central controller is operated by the rental agent at the rental site or other remote site RS and is remote from work site WS. The user obtains the power source 130 from remote site RS and transports it to work site WS to perform an operation 150, as shown. User pays a fee for rental of power source 130 with a selected configuration, but may discover once at the work site that the selected configuration needs to be altered i.e. more time, functionality etc as described above. This change in functionality may require payment of an additional or reduced fee. If an additional fee is required, the user could use payment component 280 to make the payment remotely at work site WS. Central controller 110, upon receiving verification and confirmation of payment, could then change the functionality of power source 130 remotely from remote site RS.

Payment component 280 may include a card reader, scanner, cash receiving machine or other device 281 (FIG. 6) that processes a payment token 282, such as a credit card, debit card, gift card, QR code, bar code, RFID chip, magnetic strip, or cash. Alternatively, payment component 280 can be incorporated into controller 200, such that the user may charge payment to an account. In this instance, as shown in FIG. 7, payment component 280 may be accessed through an input component 204 associated with onboard controller 200, such as a keypad, touch screen, and the like. In either instance, payment component 280 is in communication with the network 120 for purposes of processing payment using third party vendors or through the owner of the power source directly. Payment processing and verification may be communicated to central controller 110 to allow an alteration of an operating parameter as described above. For example, a power source 130 having an overall power output capacity of 500 amps may be rented for use at a 300 amp level. The user decides that operation at the 500 amp level is needed. User communicates the need for the additional power to central controller 110 through onboard controller 200 of alternate communications means including but not limited to accessing central controller 110 via the internet or other communication network 120. In turn, central controller 110 communicates a price for the additional power output and accepts payment via payment component 280. Upon confirming payment, central controller 110 communicates a command to onboard controller 200 to increase the available power from 300 amp to 500 amp.

With reference to FIG. 2, a power source system includes plural power sources that form a fleet F of power sources 130 that are in communication with a central controller 110. Communication may occur via a network 120. Power sources may reside at a location that coincides with the location of central controller 110 at the time of purchase or rental, and then be moved to a work site WS where an operation is performed using power source 130. Each power source 130 in fleet F may be deployed to one work site WS or to different work sites as needed.

Figure 10:
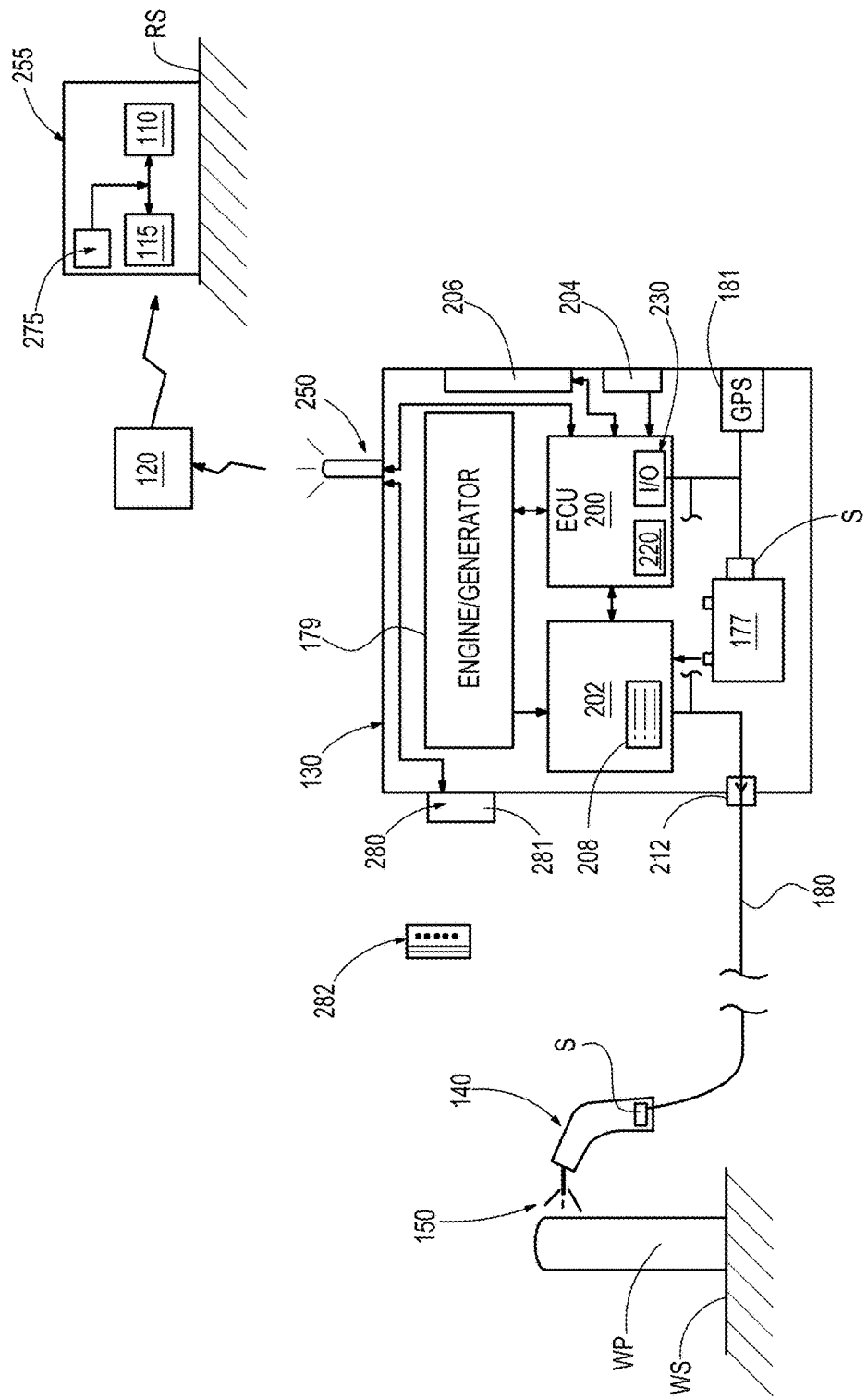
FIG. 10 is a schematic block diagram of a power source system according to an embodiment.

FIG. 10 depicts an embodiment that is similar to FIG. 6 described above. In FIG. 10, the power source 130 is an engine-driven electric arc generation device that includes an internal combustion engine coupled to a generator (engine/generator 179). The power circuit 202 can be an arc generation power supply that is powered by the engine/generator 179. The arc generation power supply can supply electrical energy to the implement 140 for performing a desired welding operation, cutting operation, etc. The implement 140 can be a welding torch, a cutting torch, or the like, and can be operatively connected to the arc generation power supply to receive electrical energy therefrom.

The power source 130 further includes a position signal receiver 181 that is configured to receive a position signal and generate current position information based on the position signal. The current position information includes data that identifies the current position of the position signal receiver 181. The position of the position signal receiver 181 changes as the power source 130 is moved, driven, etc., and the position signal receiver can update the current position information periodically, such as several times per second. The position signal receiver 181 communicates with the controller 200 and periodically transmits the current position information to the controller. The position signal receiver 181 and the controller 200 can communicate wirelessly or through a wired connection.

One example of a position signal receiver 181 is a global navigation satellite system (GNSS) receiver. GNSS receivers receive GNSS signal transmissions from satellites in orbit and, based on the time of travel of each of the transmissions, determine the position of the GNSS receiver. GNSS receivers include Global Positioning System (GPS) receivers configured to receive GPS signals, and receivers for the Galileo and GLONASS systems.

The controller 200 can be an engine control unit ECU for controlling operations of the internal combustion engine. In certain embodiments, the controller 200 can also control operations of the power circuit 202 as discussed above. The ECU 200 can control the maximum power generated by the internal combustion engine by controlling, for example, the throttle or fuel injection pulse duration or frequency of the engine, and/or other operating parameters that affect the maximum power generated by the engine.

It can be desirable to control the maximum power output of the engine based on the physical location of the engine. Different political divisions corresponding to different locations can subject internal combustion engines to specific requirements based on the maximum power that can be generated by the engine. For example, one political division (e.g., state, city, province, etc.) might levy a tax on internal combustion engine operators based on the size (e.g., hp or kW) of the engine, while a neighboring political division might tax the engine differently or not at all. Moreover, within a political subdivision, engines of different sizes might be regulated or taxed differently. For example, an engine greater than 50 hp might be taxed at a higher level than engines at or below 50 hp.

The ECU 200 is configured to control the maximum power output level of the internal combustion engine according to different power routines. For example, the ECU 200 can store different engine control routines or tables (e.g., a low power routine and a high power routine) in its data store 220, for operating the engine at a desired power level. A high power routine can correspond to the normal, rated power output of the engine. The ECU 200 is operatively connected to the position signal receiver 181. Based on the current position information received from the position signal receiver 181, the ECU 200 can automatically switch from a higher power routine to a lower power routine when entering a political division that imposes some cost based on engine size and such cost can be reduced/minimized by implementing a lower power routine. Similarly, the ECU 200 can automatically switch from a lower power routine to a higher power routine when leaving such a political division.

The data store 220 can include stored region data, also referred to as "predetermined region data" or "predetermined low power routine region data". The stored region data can define locations in which a low power routine is to be used and/or locations in which a high power routine is to be used. The stored region data can also associate different locations with particular power routines. The ECU 200 can be programmed to compare the current position information received from the position signal receiver 181 with the stored region data and to automatically switch the power routine for the engine based on the current location of the engine to, for example, automatically limit the maximum power output level of the engine when it runs. Alternatively, the ECU 200 can transmit the current position information to a remote device, such as the remote system 255, and the remote system can compare the current position information with stored region data and instruct the ECU 200 as to which power routine (e.g., a low power routine or a high power routine) to implement.

Various components of the system 100 have been described with reference to multiple embodiments depicted in the figures. It will be understood that these components and structures shown in the figures may be interchanged or substituted amongst the depicted embodiments, which are not limiting.

Figure 8:
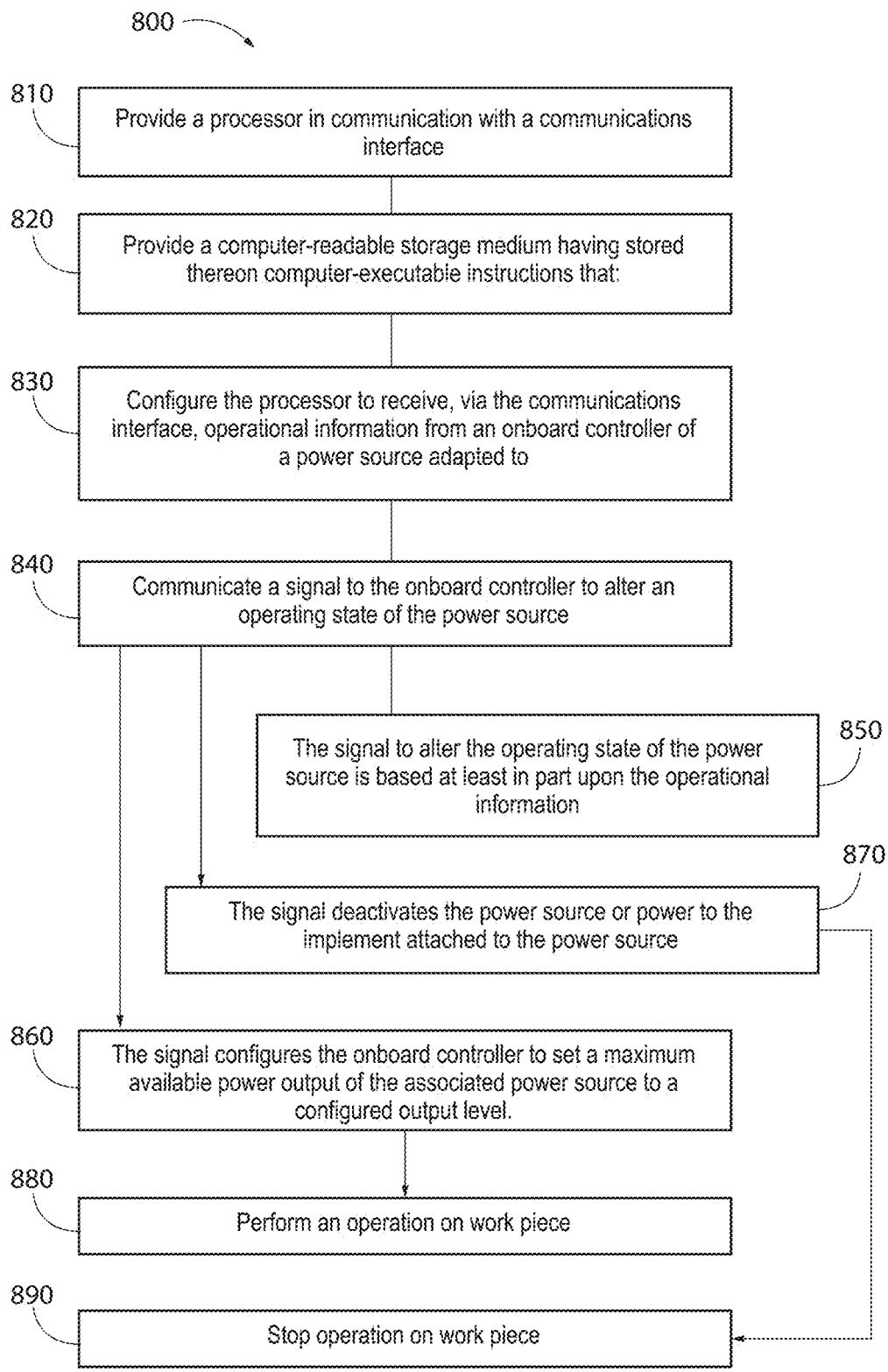
FIG. 8 is an operational flow diagram showing a method of operating the power source system according to an embodiment.
Figure 9:
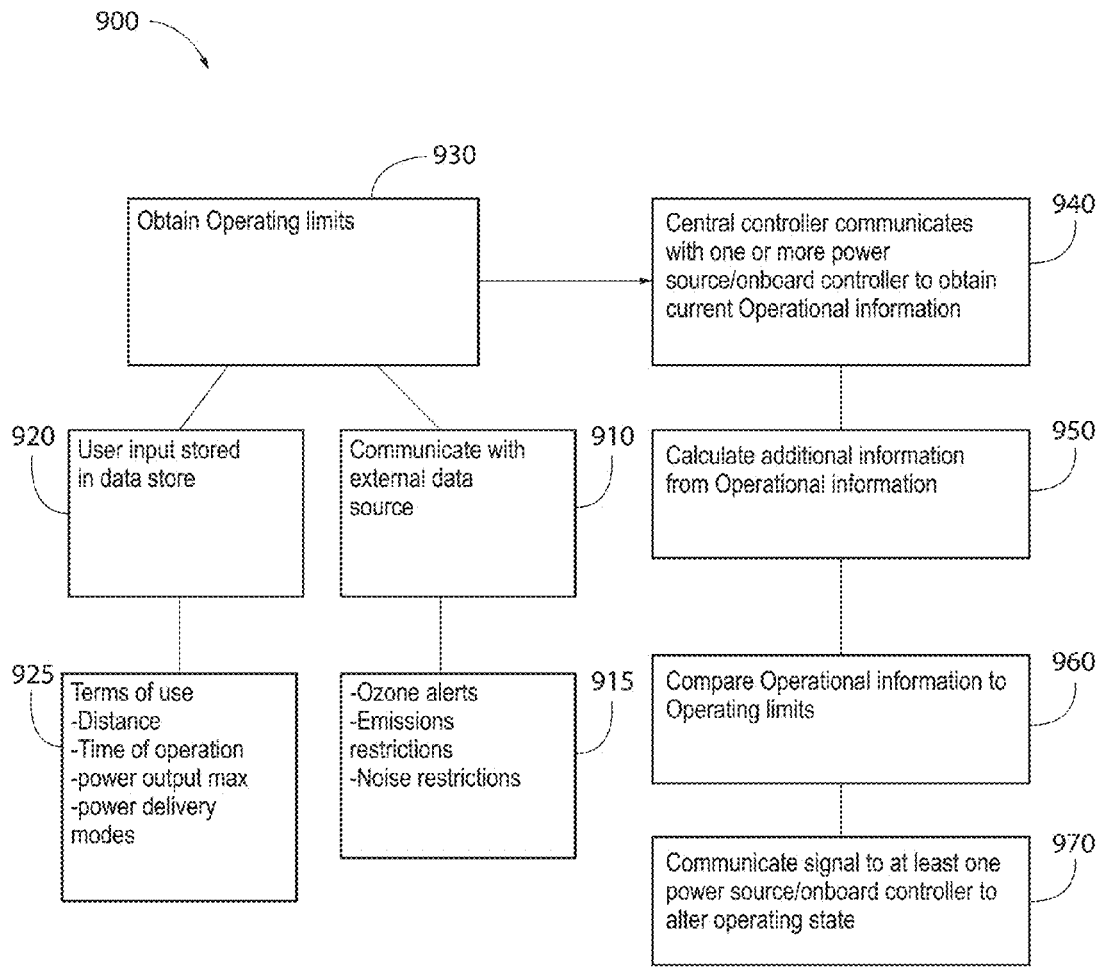
FIG. 9 is an operational flow diagram showing a method of operating the power source system according to an embodiment.

FIGS. 8 and 9 illustrate a methodology for providing various aspects including providing configuration information to one or more power sources 130 located remotely from a central controller 110. Reference will be made to components described above and depicted in FIGS. 1-7. The method comprises a group of actions or processes represented by blocks. While, for purposes of simplicity of explanation, the methodology is shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

In accordance with an embodiment, a method 800 includes providing a processor 125 in communication with a communications interface 250 at 810. The method includes providing a computer-readable storage medium 126 that stores computer-executable instructions thereon at 820. The processor 125 is configured to receive via the communications interface 250 operational information from an onboard controller 200 of a power source 130 at 830. The processor 125 is adapted to configure one or more parameters of the processor 125. For example, at 840, processor 125 communicates a signal to onboard controller 200 to alter an operating state of power source 130. As shown at 850, alteration of the operating state of power source 130 is based at least in part upon operational information. The operating state may include a parameter such as the configurable power output of power source, an engine operating limit, and an accessory operating limit of each power source based on the geographic based alert information According to another embodiment, at 860, set a maximum available power output of the associated power source to a configured output level that is less than the maximum power output. For example, a power source 130 with a maximum power output of 500 amp may be configured by a signal from processor 125 to a configurable output power of 300 amp for a selected operation, and so configured, the method includes performing an operation on the workpiece WP. If the power source 130 had been previously configured at a lower level, signal may set an increased power output level compared to the current configured level. Once the power source is configured, the method includes performing an operation on a work piece, for example, welding, cutting, heating etc in a welding context or mixing in a cement mixing context. In a vehicle context, the operation may include operating the vehicle i.e. moving the vehicle.

According to another embodiment, at 870, the signal deactivates the power source or power to the implement attached to the power source. In one example, the method includes a signal from processor 125 on central controller 110 to configure onboard controller 200 to deactivate the power source or to stop operation on a workpiece WP 890. For example, in a rental context, such a signal may be sent when a maximum usage limit or time limit has been reached or if the user attempts to move the power source 130 outside of a permitted geographical area.

According to another embodiment, controller 110 tracks operational information including the parameters discussed above and operating limits that may be imposed by the rental agreement, legal restrictions, safety considerations, or other similar limits. For example, in a rental context, an operating limit includes an operating geographical area or distance from a location, maximum operating time, maximum check out time, maximum power output, permitted power delivery modes, which may be imposed by agreement, emissions limits, noise limits etc. In one embodiment, processor 125 of controller 110 is programmed to communicate with onboard controller 200 to obtain operational information from onboard controller 200 including but not limited to time of operation, the configurable power output maximum, geographic location, configurable power delivery modes and the like. According to the method 900, central controller 110 may obtain operating limits from a source at 930; communicate with one or more power source 130 or its onboard controller 200 at 940 to obtain current operational information; and optionally perform a calculating step to obtain secondary operating information at 950. For example, central controller 110 may subtract time when the power source is on but no operation is occurring to determine the idle time versus the active time. According to another example, the central controller 110 may use the geographic location of the power source 130 to determine distance from a particular location or region or distance from a source. According to another example, central controller may calculate emissions or noise output based on engine speed or other engine operating conditions. Alternatively, any of the calculating steps may be performed by onboard controller 200 and simply reported to central controller 110 through the communications step.

The operational information obtained from power source 130 or calculated operational information is then compared at 960 to operating limits obtained at 930. If operational limits are exceeded or alteration of the operation of one or more power source 130 is needed, central controller 110 sends a signal to power source 130 or its associated onboard controller 200 to alter an operating state of the power source 130 at 970.

Operational limits obtained at 930 may be stored in data store and include preprogrammed operating limits such as those set up in a rental agreement, terms of use etc. For example as shown, these may include distance, time of operation, power output maximum level, permitted modes of power delivery and the like. According to an embodiment, central controller 110 may communicate with a data source to obtain additional operating limits including, for example, ozone alerts, emissions limits, noise restrictions and the like that may limit operation of a power source. The comparison step may include referencing both user provided operating limits 920 or external operating limits obtained from an external data source 910. For example, based on the engine operating information and geographic location, central controller may send a signal to limit engine operation based on an ozone alert, noise restriction, or emissions restriction imposed on the geographic area 915 where the power source is located. User inputs may include, for example, limits imposed by an agreement or terms of use 925 including but not limited to distance, time of operation, power output, and permitted power delivery modes, such as wave forms, pulse functions and the like.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

In accordance with one embodiment a power source system includes plural power sources, wherein each of the plural power sources is adapted to provide a configurable power output to an implement, and wherein each of the plural power sources has an onboard controller; a central controller that is remote from the plural power sources; the central controller being in communication with respective onboard controllers via one or more networks, the central controller being adapted to communicate a signal to at least one onboard controller to selectively alter an operating condition of an associated power source. In one example, the signal instructs the onboard controller to deactivate power to the implement or deactivate the associated power source to prevent operation thereof. In another example, the signal configures the onboard controller to set a maximum available power output of the associated power source to a configured output level. The configured output level may be a selected amperage, voltage, wattage or other unit of measurement commonly referred to in a given application or industry. For example, in a welding application it is common to refer to power in terms of an amperage. For example, the configurable power may be expressed as 100 amp, 300 amp, 500 amp and so on. These values are provided as examples. It will be understood that any value between 0 and the maximum available power for a given power source may be used.

According to another exemplary embodiment, the onboard controller is adapted to monitor an emission level of the associated power source and communicate emission information to the central controller; and wherein the central controller receives the emission information from the onboard controller and a maximum available power output of the associated power source based on the emission information received.

According to another exemplary embodiment the implement is a welding torch. In another exemplary embodiment, the implement is a cutting torch.

According to another exemplary embodiment at least one of the plural power sources includes an accessory, and wherein the operating condition includes an activation state of the accessory.

According to another exemplary embodiment, the onboard controller includes a sensor that tracks a limiting condition and communicates a value of the limiting condition to the central controller, and wherein upon detection of the value of the limiting condition reaching a selected limit, the central controller alters the operating condition. According to a further example, the limiting condition includes at least one of an operating time limit, a geographical limit, an emissions limit, a pollution limit, a noise limit, a network connectivity limit, and a time limit.

Another exemplary embodiment includes power source system including power source in communication with a power source network, wherein each of power source in the network has an active mode where power is provided to an implement and an idle mode where no power is being provided to the implement; a central controller in communication with the power source network, the central controller being remote from the power source and in communication with the power source via the power source network, wherein the central controller monitors a time period of operation for the power source, wherein the time period of operation includes active mode time but excludes idle mode time, and wherein the central controller deactivates the power source when a respective time period of operation exceeds an authorized period of operation.

According to another exemplary embodiment, the implement is a welding torch.

According to another exemplary embodiment, the central controller calculates a charge based on the time period of operation. According to a further embodiment, the power source includes a payment component, wherein the central controller communicates with the payment component and wherein the central controller includes a maximum period of operation for each of the plural power sources and deactivates a selected power source when the time period of operation is reached. According to a further example, the central controller is adapted to allocate an additional maximum period of operation or an extension of the maximum period of operation upon receiving a selected payment from the means for payment.

Another exemplary embodiment includes power source system including a processor; a communications interface; and a computer-readable storage medium having stored thereon computer-executable instructions that, when executed by the processor, configure the processor to: receive, via the communications interface, operational information from an onboard controller of a power source adapted to provide a configurable power output to an implement; and communicate a signal to the onboard controller to alter an operating state of the power source based at least in part on the operational information. According to on example, the signal instructs the onboard controller to deactivate power to the implement or deactivate the associated power source to prevent operation thereof. According to another example, the signal configures the onboard controller to set a maximum available power output of the associated power source to a configured output level.

Another exemplary embodiment includes power source system including plural power sources, wherein each of the plural power sources is adapted to provide a configurable power output to an implement, and wherein each of the plural power sources has an onboard controller; a central controller that is remote from the plural power sources and in communication with each power source, wherein the central controller tracks a location of each of the plural power sources and wherein the central controller receives geographic based alert information; wherein the central controller sets a parameter including at least one of the configurable power output, an engine operating limit, and an accessory operating limit of each power source based on the geographic based alert information. According to one example, the geographic based alert information includes ozone action alerts. According to another example, the geographic based alert information includes a noise restriction. According to a further example, the geographic based alert includes a permitted geography limit.

These and other objects of this invention will be evident when viewed in light of the drawings, detailed description and appended claims.

The subject innovation can be used with any suitable engine-driven welder, engine-driven welding system, engine-driven welding apparatus, a welding system powered by an engine, a welding system powered by an energy storage device, others not expressly listed, and/or combinations thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as arc welding, plasma cutting, and gouging operations. It is to be appreciated that a power source can generate a portion of power, wherein the portion of power is electrical power. It is to be appreciated that "power source" as used herein can include a motor, an engine, a generator, an energy storage device, a component that creates electrical power, a component that converts kinetic energy into electrical power, or a combination thereof. By way of example and not limitation, FIGS. 1-4 illustrate welding systems or devices that can be utilized with the subject innovation. It is to be appreciated that the following welding systems are described for exemplary purposes only and are not limiting on the welding systems that can utilize the subject innovation or variations thereof.

What is claimed is:

1. A method of controlling an engine-driven electric arc generation device, comprising the steps of:
   providing the engine-driven electric arc generation device, wherein the engine-driven electric arc generation device comprises:
      an internal combustion engine operatively coupled to an electric generator;
      an arc generation power supply powered by the electric generator;
      an engine control unit (ECU) configured to control a maximum power output level of the internal combustion engine when running, according to one of a low power routine and a high power routine; and
      a global navigation satellite system (GNSS) receiver operatively connected to the ECU;
   receiving, by the GNSS receiver, GNSS signals;
   determining current position information of the engine-driven electric arc generation device from the GNSS signals;
   comparing the current position information to predetermined low power routine region data; and
   automatically switching, by the ECU, from the high power routine to the low power routine based on a result of comparing the current position information to the predetermined low power routine region data, to automatically limit the maximum power output level of the internal combustion engine according to the low power routine when running.

2. The method of claim 1, wherein the step of comparing the current position information to the predetermined low power routine region data is performed by the ECU.

3. The method of claim 1, wherein the step of comparing the current position information to the predetermined low power routine region data is performed by a central controller that is remote from the engine-driven electric arc generation device.

4. The method of claim 1, further comprising the step of automatically switching, by the ECU, from the low power routine to the high power routine based on another result of comparing current position information to the predetermined low power routine region data.

5. The method of claim 1, wherein the engine-driven electric arc generation device includes a welding torch operatively connected to the arc generation power supply.

6. The method of claim 1, wherein the engine-driven electric arc generation devices includes a cutting torch operatively connected to the arc generation power supply.

7. The method of claim 1, wherein the GNSS receiver is a GPS receiver configured to receive GPS signals.

8. An engine-driven electric arc generation device, comprising:
   an internal combustion engine;
   an electric generator driven by the internal combustion engine;
   an arc generation power supply powered by the electric generator;
   an engine control unit (ECU) configured to control a maximum power output level of the internal combustion engine when running, according to one of a low power routine and a high power routine; and
   a position signal receiver operatively connected to the ECU, wherein the position signal receiver is configured to receive a position signal, generate current position information based on the position signal, and provide the current position information to the ECU, wherein the ECU is configured to compare the current position information to predetermined region data, and automatically switch from one of the high power routine and the low power routine to a different one of the high power routine and the low power routine based on a result of comparing the current position information to the predetermined region data, to automatically control the maximum power output level of the internal combustion engine according to said different one of the high power routine and the low power routine when running.

9. The engine-driven electric arc generation device of claim 8, wherein the position signal receiver is a global navigation satellite system (GNSS) receiver.

10. The engine-driven electric arc generation device of claim 8, wherein the predetermined region data defines a low power routine region in which the low power routine is used by the ECU to automatically limit the maximum power output level of the internal combustion engine when running.

11. The engine-driven electric arc generation device of claim 10, wherein the ECU is configured to automatically switch from the low power routine to the high power routine when the engine-driven electric arc generation device exits the low power routine region.

12. The engine-driven electric arc generation device of claim 8, further comprising a welding torch operatively connected to the arc generation power supply.

13. The engine-driven electric arc generation device of claim 8, further comprising a cutting torch operatively connected to the arc generation power supply.

14. A method of controlling an engine-driven device, comprising the steps of:

providing the engine-driven device, wherein the engine-driven device comprises:
an internal combustion engine;
an engine control unit (ECU) configured to control a maximum power output level of the internal combustion engine when running, according to one of a low power routine and a high power routine; and
a global navigation satellite system (GNSS) receiver operatively connected to the ECU;

receiving, by the GNSS receiver, GNSS signals;
determining current position information of the engine-driven device from the GNSS signals;
comparing the current position information to predetermined low power routine region data; and
automatically switching, by the ECU, from the high power routine to the low power routine based on a result of comparing the current position information to the predetermined low power routine region data, to automatically limit the maximum power output level of the internal combustion engine according to the low power routine when running.

15. The method of claim 14, wherein the step of comparing the current position information to the predetermined low power routine region data is performed by the ECU.

16. The method of claim 14, wherein the step of comparing the current position information to the predetermined low power routine region data is performed by a central controller that is remote from the engine-driven device.

17. The method of claim 14, further comprising the step of automatically switching, by the ECU, from the low power routine to the high power routine based on another result of comparing current position information to the predetermined low power routine region data.

18. The method of claim 14, wherein the GNSS receiver is a GPS receiver configured to receive GPS signals.

* * * * *